United States Patent [19]

King

[11] Patent Number: 4,796,023

[45] Date of Patent: Jan. 3, 1989

[54] STABILIZED BINARY TREE PROTOCOL

[76] Inventor: Robert E. King, 200 Dandalk Way, Cary, N.C. 27511

[21] Appl. No.: 938,635

[22] Filed: Dec. 5, 1986

[51] Int. Cl.⁴ .................. H04Q 9/00; H04Q 11/04; G06F 7/00

[52] U.S. Cl. ............... 340/825.020; 340/825.510; 370/58; 364/300

[58] Field of Search .......... 340/825.02, 825.5, 825.51, 340/825.02; 370/85, 60, 58, 16, 54, 60; 364/716, 194, 136, 147, 194, 300; 375/27

[56] References Cited

U.S. PATENT DOCUMENTS

| | | | |
|---|---|---|---|
| 4,071,908 | 1/1978 | Brophy | 364/900 |
| 4,314,233 | 2/1982 | Clark | 340/825.02 |
| 4,345,326 | 8/1982 | Dieudonne et al. | 370/58 |
| 4,562,426 | 12/1985 | Forney, Jr. | 375/27 |
| 4,562,427 | 12/1985 | Ecton | 340/825.87 |
| 4,701,756 | 10/1987 | Burr | 340/825.5 |

OTHER PUBLICATIONS

Capetanakis, "Contention Resolving Tree Algorithms for Multiple Access Channels," IEEE CH 1435-7/79/0000 (1979).

Primary Examiner—Donald J. Yusko
Attorney, Agent, or Firm—Baker & Daniels

[57] ABSTRACT

A binary tree protocol (FIG. 6 for example) in which for any given state in the binary tree, the subsequent state for each right substate is determined by applying the same state logic. In the preferred embodiment, (FIG. 6) a subsequent state of state 7, for example, may be state 2, just as the subsequent state of state 5 may be state 3. Since the state logic for the right-most substates is the same as for all other right substates, the concept of a "processing cycle" is eliminated. The protocol continuously moves from state to state (FIGS. 1, 6, 7, 8).

14 Claims, 9 Drawing Sheets

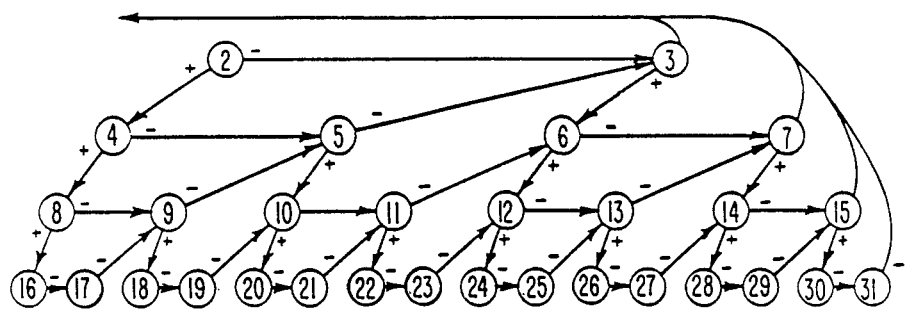
FIG.5B 4 PRIOR ART
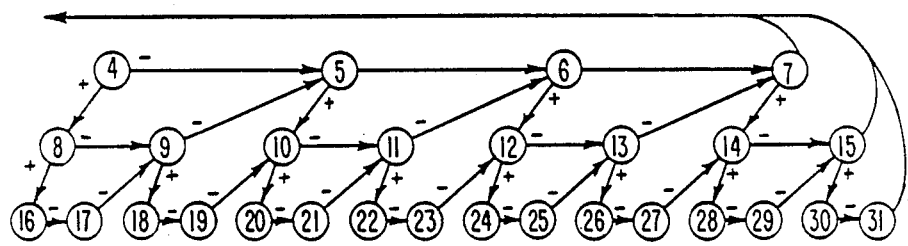
FIG.5B 3 PRIOR ART
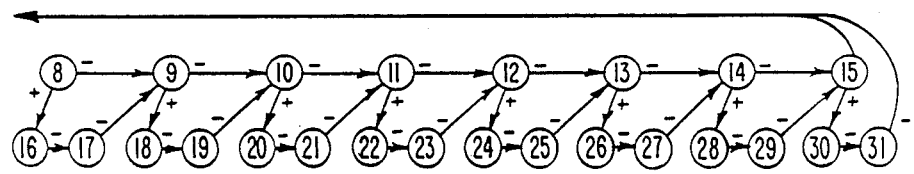
FIG.5B 2 PRIOR ART
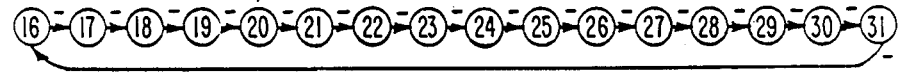
FIG.5B 1 PRIOR ART
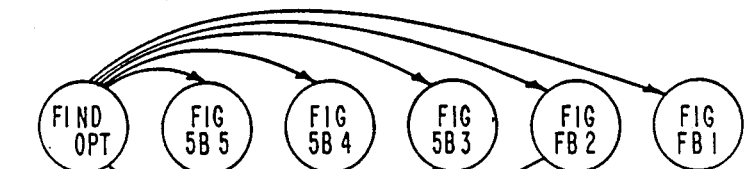
FIG.5A PRIOR ART

STABILIZED BINARY TREE PROTOCOL

FIELD OF THE INVENTION

The present invention relates to a system for collecting data messages from a plurality of remote terminals, as in wide or local area computer networks. In particular, the invention relates to an apparatus and method for efficiently identifying those remote terminals which have data messages to transmit, and collecting those messages.

BACKGROUND OF THE INVENTION

Terminal controllers are communication devices which provide an interface between a plurality of terminals and a host computer or a communication system. Each terminal connected to the controller may, at any given time, have a message to send to the host computer or another terminal. The terminals are typically connected via a common bus or coaxial cable, and thus share the same data path for transmitting messages. The purpose of the controller is to orderly and efficiently collect messages from the terminals, according to some protocol.

One of the objectives of any protocol is to allow messages to be received very quickly when only a few terminals have messages to transmit, while still allowing all messages to be transmitted within a relatively short period of time when nearly all terminals in a network have a message to transmit. In general, prior art techniques attempt to strike a balance between these two objectives. For example the controller in a polled multidrop network polls (or is enabled to receive a message from) a single terminal at one time. Thus, each individual terminal is allocated a time slot to transmit a message, whether or not the terminal has message to transmit. This method is efficient when the network is heavily loaded, because the controller spends no time in deciding which terminal to poll. However, this method is very inefficient when the network is lightly loaded. For example if only one terminal has a message to transmit but there are 64 terminals on the network, then the network is only operating at one sixty-fourth of its capacity, since all the other terminals are polled even though they do not have messages. Consequently, in a lightly loaded 64 terminal network, each message has to wait an average of 32 polls.

Other protocols logically arrange a group of terminals into a binary tree. From the "root" of the tree, the controller determines if a message is ready to be transmitted from any of the terminals. If any terminal has a message to transmit, the controller subdivides the tree in halves to determine which half has a message to transmit. This process is repeated until a single terminal has been isolated with a message to send. After the message is sent, the controller determines if the untested "halves" of the binary tree have terminals with messages to send, until all terminals have been queried. This process is efficient when there are only a few terminals with a message to transmit. In a network with 64 terminals, a single terminal with a message can be identified in 7 queries by probing 64, 32, 16, 8, 4, 2, and finally the last terminal. However, when the network is heavily loaded, this protocol is inefficient because it takes seven queries for each terminal with a message, or 448 queries if all 64 terminals have just one message. This is far more than the 64 queries needed to process all terminals under the polled multidrop protocol described above.

For a centrally controlled network (as described below), the method used by the controller to select subgroups is as follows: The controller sends a signal to all terminals in a group or subgroup, indicating to each terminal that a response should be sent back if the terminal has a message to send. This signal is known as a "probe." If the controller receives a response, then it subdivides the group into two subgroups and probes the first group. If a response is received again, the process is duplicated. If not, the second group is probed. The controller cannot distinguish the number of responses it receives from a probe, only the existence of at least one response. When a terminal with a message is utlimately identified by repeated group subdivisions, the controller sends that terminal a "poll," indicating that it is ready to receive the actual message from the terminal. This is known as a probe/poll protocol.

The protocol described in Brophy (U.S. Pat. No. 4,071,908 incorporated herein by reference) attempts to strike a balance between light-load and heavy-load network efficiency by beginning probes to terminals at levels below the "root" of the binary tree, depending on how heavily the network is loaded. (See FIG. 5) For example, if a 64 terminal network is fully loaded the protocol will probe each terminal individually at the lowest level, in a manner identical to the polled multidrop protocol. If the network is only moderately loaded, the the protocol may begin probing at a middle level, probing 4 terminals at a time, for example. If any one of the four terminals has a message to transmit, that group will be subdivided and probed again, as described above. The process will be repeated for the remaining 15 groups of 4 terminals. At the end of each cycle, the time it took to poll all the terminals is determined and used to calculate which level in the tree structure polling should begin for the next cycle. If the previous cycle took a long time to complete, (indicating heavy usage,) the probing will start at a low level, while a short cycle time will cause an initial probe to begin at a higher level, or even the root of the tree.

There are several problems with this protocol. First, additional hardware is required to keep track of the time required for each cycle, and to compute the appropriate probing level in the tree for each cycle. The time required for these computations also cuts into overall processing time overhead. Second, sporadic cycle delays caused by poor design or noise in the network can "fool" the protocol into thinking that there are more messages on the network than there really are, causing the network to probe terminals at an inappropriately low level. Third, the protocol is inefficient for multiple access networks, as described below.

Terminal controllers for implementing a networking protocol can be divided into two classes: those utilizing centralized control (CC) and those utilizing distributed control (DC). The primary difference between these two classes is that a centralized controller must poll (or address a specific terminal) before the terminal can send a message. On the other hand, in a distributed controlled network, each terminal can independently implement the protocol, since each message includes the address of the sending and recipient device. Thus, every terminal may independently act as controller and constantly monitor the messages on the network. However, the ability to actually receive and transmit messages is limited because only one message can be sent over the network at one time. Thus if two terminals attempt to transmit simultaneously, their messages become scrambled on the network. Such an event is referred to as a "collision." In this case, each controller recognizes that more than one terminal is attempting to send a message, but is unable to identify the specific source or content of the messages.

As described in Capetanakis, "Contention Resolving Tree Algorithms for Multiple Access Channels," IEEE CH 1435-7/79/0000 (1979) incorporated herein by reference, a probing/polling protocol such as that described by Brophy can also be used in a DC multiple access network. This can result in a significant increase in network efficiency. For example, if there is only one terminal with a message to send in DC network, that message will be received and processed by the controller when it probes the root of a binary tree. Thus, the subsequent subdivisions of the tree to find the single terminal sending the message are unnecessary. A subdivision is necessary only when two or more terminals attempt to send a message at the same time, resulting in a collision.

MAJOR SHORTCOMING OF PRIOR ART PROTOCOLS

Every time a binary tree protocol selects a specific group or subgroup of terminals to be enabled to transmit messages, the ability to enable the group or subgroup can be referred to as a "state." For example, enabling all the terminals in a network at once may be referred to as "state 1", enabling the first half of the terminals may be called "state 2," and enabling the second half of the terminals may be called "state 3." As binary tree protocols are implemented, the protocol constantly changes states in order to enable different groups or subgroups of terminals.

The major shortcoming of the prior art protocols is that there is no consistent method used to determine a subsequent state from a current state. For example, if a protocol is in state 6, (to choose a random state) the protocol may use one method to determine what the next state should be. However, if the protocol is in state 15, the protocl may use an entirely different method to determine the next state.

This shortcoming forces prior art protocols to be able to implement different algorithims at different times during a single processing cycle. This limitation necessitates that the protocols be implemented using more hardware and software than a protocol not having this limitation.

OBJECTS OF THE INVENTION

One object of the invention is to provide a binary tree network protocol in which for any given state in the binary tree, the next state is determined by the same method.

Another object of the invention is to provide a binary tree network protocol in which for any given state in the binary tree, the next state is determined as a function of the existence of one or more messages in the given state and in particular, the receipt of a message in the given state.

Another object of the invention is to provide a binary tree network protocol in which the method used to determine the subsequent state from a prior state in the right-most branch states of the binary tree is the same function that is used to determine subsequent states in non-right-most branch states in the binary tree.

Another object of the invention is to provide a a network protocol that efficiently handles traffic when the network is lightly loaded and when the network is heavily loaded.

Another object of the invention is to provide a network protocol that requires no significant hardware or software overhead to determine subsequent states of the network.

Another object of the invention is to provide a network protocol that allows subsequent states to to be determined by using the current state and a binary signal indicating the existence or non-existence of a message in the current state as an address to a ROM or RAM, which stores at the specified address a binary representation of the subsequent state.

Another object of the invention is to provide a network protocol that may be implemented using either central control or distributed control.

Another object of the invention is to provide a network protocol that may be implemented using a probe/poll technique.

Another object of the invention is to provide a network protocol that may be implemented using a Carrier Sensed Multiple Access/Collision Detection (CSMA/CD) technique.

Another object of the invention is to provide a network protocol that can be implemented using inexpensive hardware.

Still other objects and advantages of the invention will become apparent to those of skill in the art after reading the following description of a preferred embodiment.

SUMMARY OF THE INVENTION

The invention comprises a binary search tree protocol in which for any given state in the binary tree, the subsequent state can be determined by applying a consistent algorithim. In the preferred embodiment, the algorithim determines a subsequent state based on the existence of one or more messages being present at the current state. This algorithim is applied not only throughout each processing cycle, but is also used to determine the next state for each processing cycle. Since the same algorithim is always used, the entire concept of a "processing cycle" can actually be eliminated: the protocol continuously moves from state to state, applying the same algorithim, and there is no necessary logical end to the process.

BRIEF DESCRIPTION OF THE DRAWINGS

FIGS. 5A and 5B1-5B4 is provided as being representative of a prior art state transition diagram for a Adaptive Polling protocol, given an optimum level.

DETAILED DESCRIPTION OF THE PRIOR ART

A brief explanation of tree searching techniques is presented to facilitate a discussion of tree protocols. Assume the number of terminals in a network is equal to an integer power of two, as in this case, 8. If one terminal has a message to transmit, one method of determining which terminal has the message is to poll them in a round robin sequence, as shown if FIG. 2. In this diagram each letter represents a terminal, and each number represents a "state" or a time-slot when the network is able to receive a message from its corresponding terminal. The polled multidrop protocol mentioned above is an example of this method. It can easily be seen that on the average, a terminal must wait between one and eight polling times to be processed. This protocol is efficient if all eight terminals have messages to send, but is inefficient if the network is lightly loaded. The plus and minus signs between the states indicate that the network moves into the following state regardless of the presence or absence of a message in the previous state.

Figure 3:
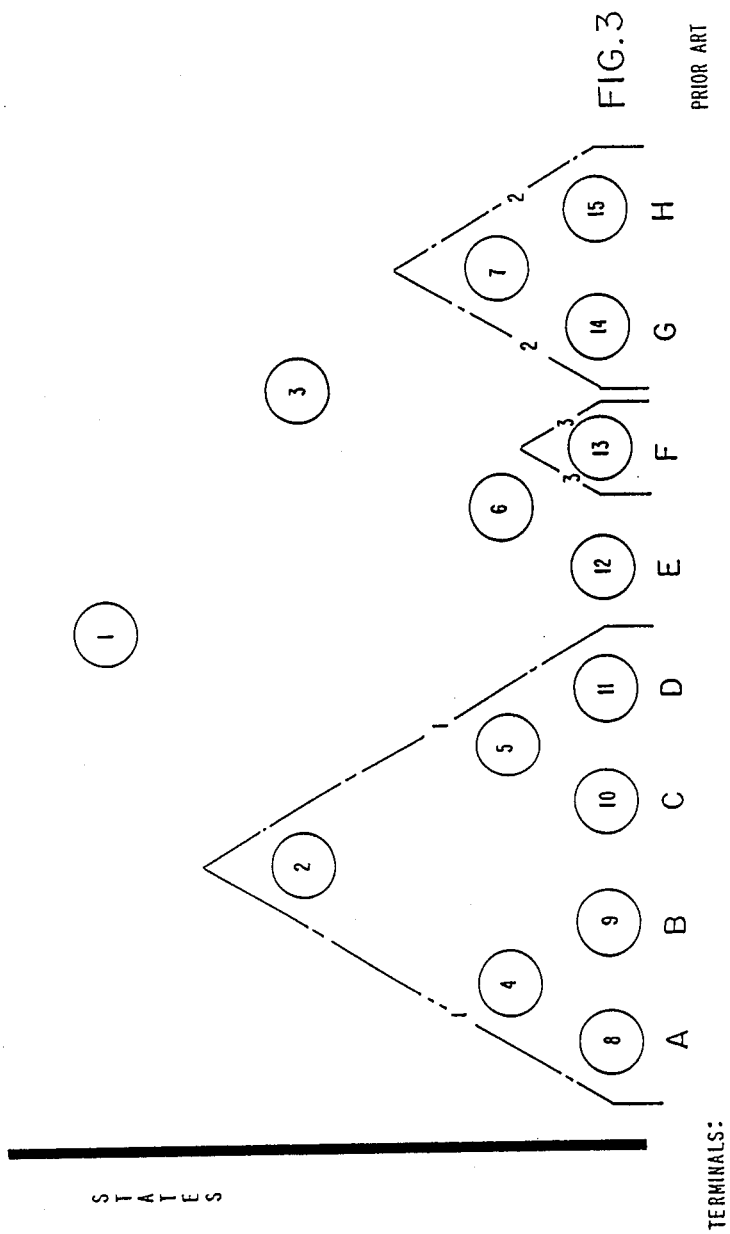
FIG. 3, is a binary tree state diagram, showing the "span" covered in various levels of the tree.

Another method of receiving messages from this set of terminals is to arrange them in a binary tree as shown in FIG. 3. The numbers in this Figure again represent states. Except in the lowest level in the tree, the network is able to listen to more than one terminal at once. For example in state 2, the network is able to listen to terminals A through D as shown by delimiting line 1, and in state 7, the network is able to listen to terminals G and H as shown by delimiting line 2. The number of terminals enabled for any given state is referred to as the "span" of the state. In state 13, the single terminal F is enabled, and the span is one, as shown by delimiting line 3.

Figure 4:
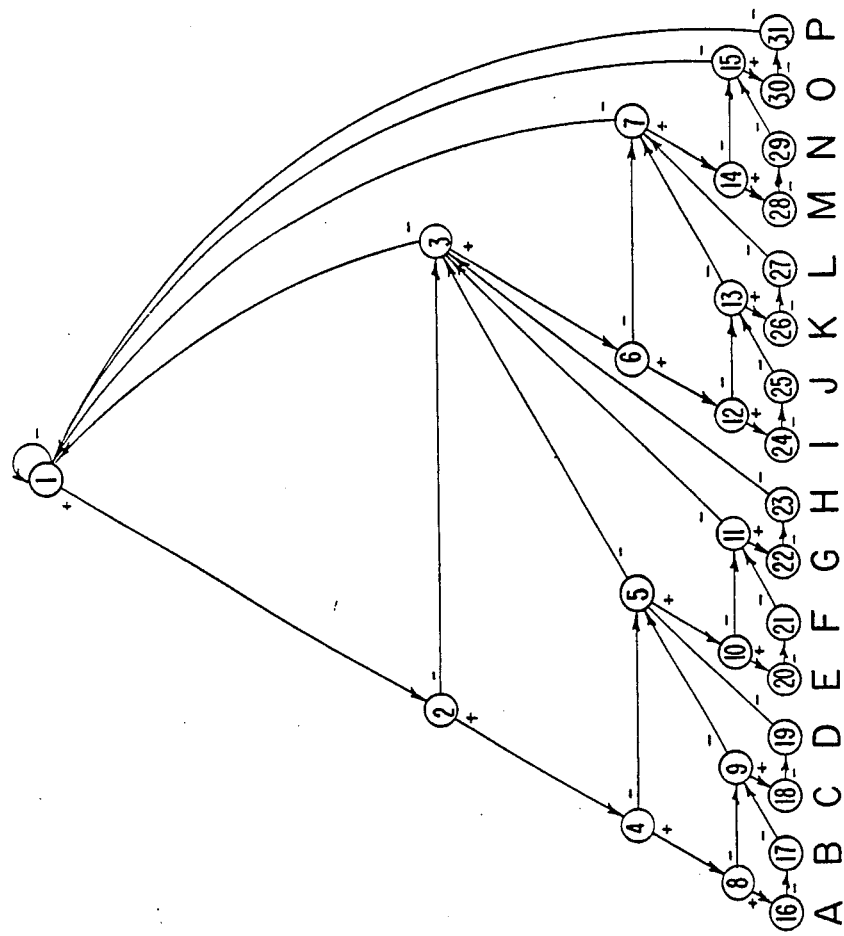
FIG. 4 is provided as being representative of a prior art state transition diagram for a Pure Probe Binary Tree Search protocol.

With reference to FIG. 4, in a binary tree protocol, it can be determined if any terminal has a message to transmit by putting the network into state 1, and listening to see if there is a message. In a CC network, the controller receives a indication of the presence of a message (but not the message itself) and subdivides the tree as described below. In a DC network, if there is only one terminal sending a message than then the message is received and processed. If more than one terminal is sending a message, then a collision occurs, and a subdivision takes place. Let us assume that terminals D and F have messages to transmit.

In a CC network, the state would go from state 1, to state 2, to state 4, to state 5, to state 10 and finally to state 11, at which time a poll would be sent to terminal D and the message transmitted. The network would then go into state 3, and a similar series of subdivisions would take place to receive the message from terminal F, resulting in four additional state transitions.

In a DC network the state would go from state 1 to state 2. Since the span of state 2 does not include terminal F, there would be no collision, and the message from terminal D would be processed. The state would then go to 3, when the message from terminal F would be received. The DC method necessitates only two state transitions to receive the two messages, as opposed to the nine transitions for the CC method.

The transitions of states in the binary tree state diagram are represented by the + arrows and − arrows in FIG. 4. If in any given state, a message is present but unable to be read (due to a collision for DC networks or not being at the lowest level in the tree for CC networks) in the span for that state, then the following state is determined by following the + arrow. If there is no message in the span, or if the message is successfully read in a DC network, then the next state is determined by following the − arrow. It may be appreciated that since collisions do not occur at the lowest level of a tree (where the span is 1), there are no + arrows from states 16 to 31 in FIG. 4.

It should be noted that there is a pattern between the state transitions throughout the tree in FIG. 4, except when the rightmost branch is encountered. After processing any messages in a right-most state, the next state always becomes state 1 to begin processing the next cycle. This is a major shortcoming of the prior art, because the hardware and software must be able to recognize when it is in a "right-most" state.

Figure 2:
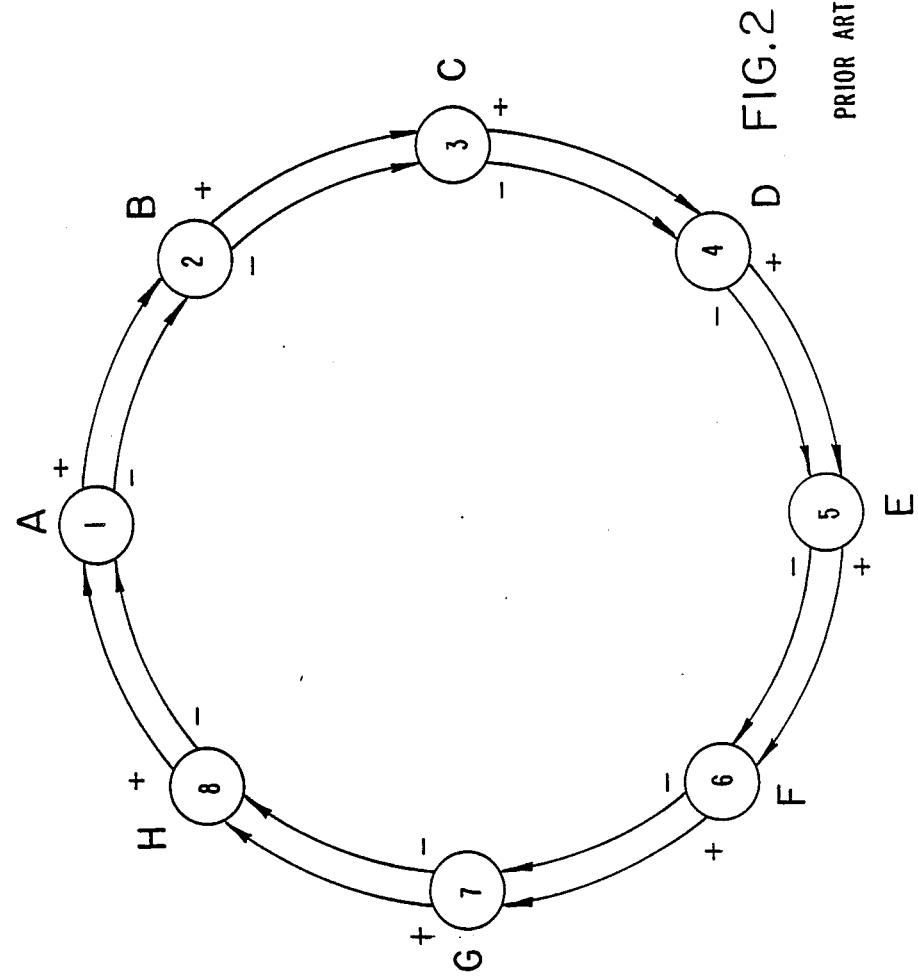
FIG. 2, is provided as being representative of the prior art, and shows a state transition diagram for a time division multiplex protocol.

It can also be appreciated that when the network is heavily loaded (all terminals have messages for example), the polled multidrop method (as shown in FIG. 2) will be more efficient, since each state will result in the receipt of a message. The binary tree search protocol will take time going "up and down" the tree between actual receipt of messages. One method of diminishing this problem is that suggested by Brophy in U.S. Pat. No. 4,071,908. As shown in FIG. 5, this is done by preventing the protocol from going into states that are "higher" than a computed level, based on the length of time it takes to complete the previous cycle.

Thus when a sixteen terminal network is lightly loaded, the protocol duplicates the binary tree search protocol. When the network is moderatley loaded, the protocol will not enter state 1. When the network is still busier, the protocol will not enter states 1 through 3. When the network is heavily loaded, the protocol will not enter states 1 through 7, but will instead "duplicate" a polled multidrop protocol and poll each terminal successively. This method is most efficient when loading reaches fifty percent or more.

One problem with this protocol is that again, there is no consistent algorithim used for determining successive states. Also, the protocol requires extra hardware and software to measure the length of a processing cycle and alter available state transitions accordingly. In addition, it is unclear if this protocol can be safely used in a DC network, since each terminal would measure the length of the processing cycle independently, creating a possibility of different terminals making different measurements.

DETAILED DESCRIPTION OF THE PRESENT INVENTION

The present invention embodies the concept of determining successive states based solely on the environmental factors of a current state. In the preferred embodiment, successive states are determined by: (1) the current state; and (2) the existence or non-existence of one or more messages in the span of the current state. Thus, successive states do not necessarily rely on the location of the current state in the binary tree (i.e. rightmost or not right-most branch), the number of messages received in a processing cycle (indeed, the concept of a processing cycle is eliminated), or the amount of time taken to complete a processing cycle.

Figure 6:
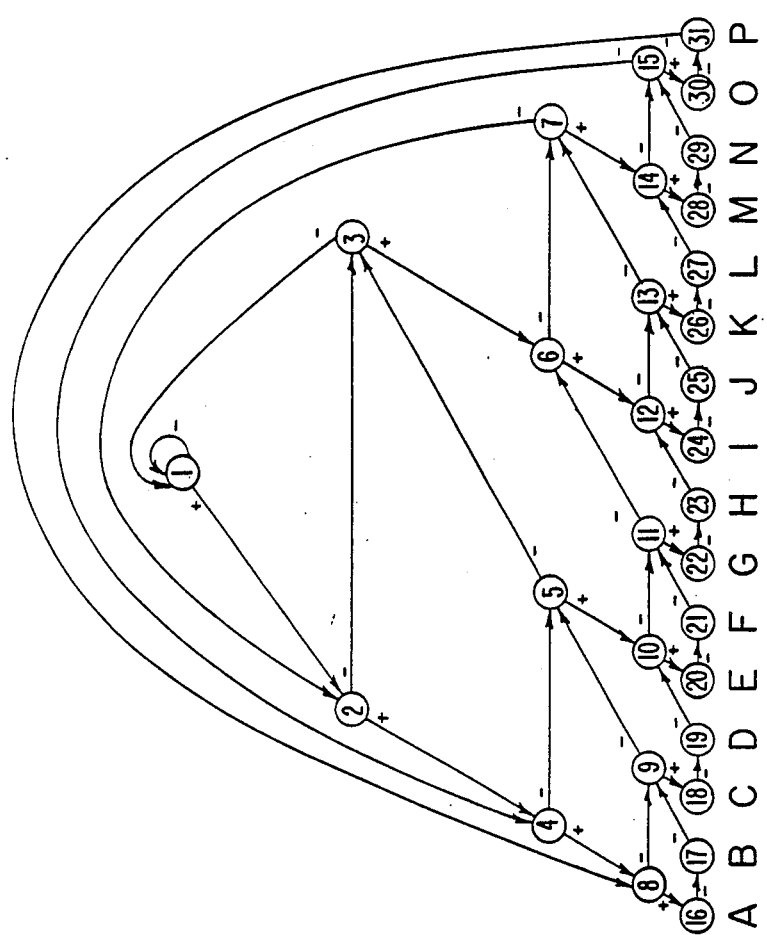
FIG. 6 is a state transition diagram for one embodiment of the present invention represented as a tree structure.

A state transition diagram for one embodiment of the present invention is shown in FIG. 6. It can be appreciated that this state transition diagram is similar to the state transition diagram for a pure probe protocol, with several important differences. First, in FIG. 4, all of the right-most states in the tree enter into state 1, while in FIG. 6, the right-most states in the tree enter into states at various levels on the left-most states in the tree. Second, in FIG. 4, the state transitions from right node states go up a number of levels depending on where in the tree the particular node is. For example, in FIG. 4, the transitions out of state 7 go up one level to state 9, while the transitions out of state 23 go up three levels, to state 3. In FIG. 6, however, all right node state transitions go up one level in the tree. In the embodiment disclosed in FIG. 6, a specific state transition is dependent only on whether a message was present in the state. This difference is critical because *this is the same criterion used by every state in the binary tree to determine the subsequent state.*

Figure 1:
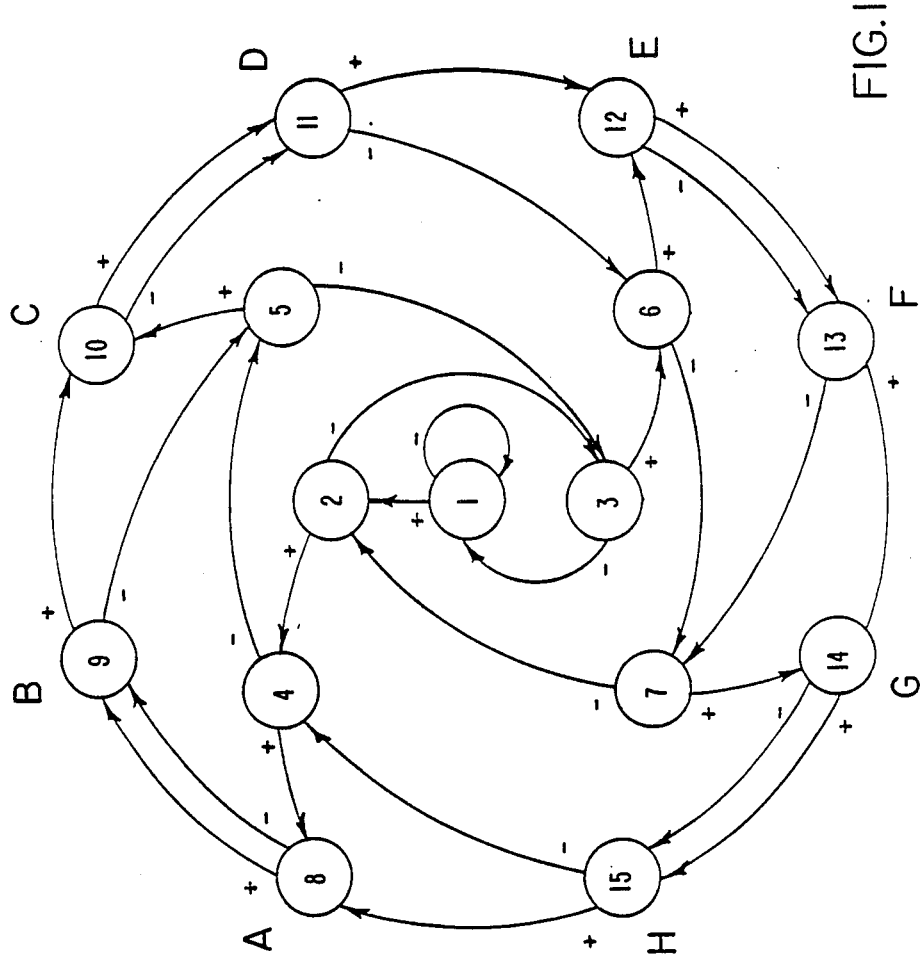
FIG. 1 is a state transition diagram for one embodiment of the invention, called a Stabilized Binary Tree.
Figure 8:
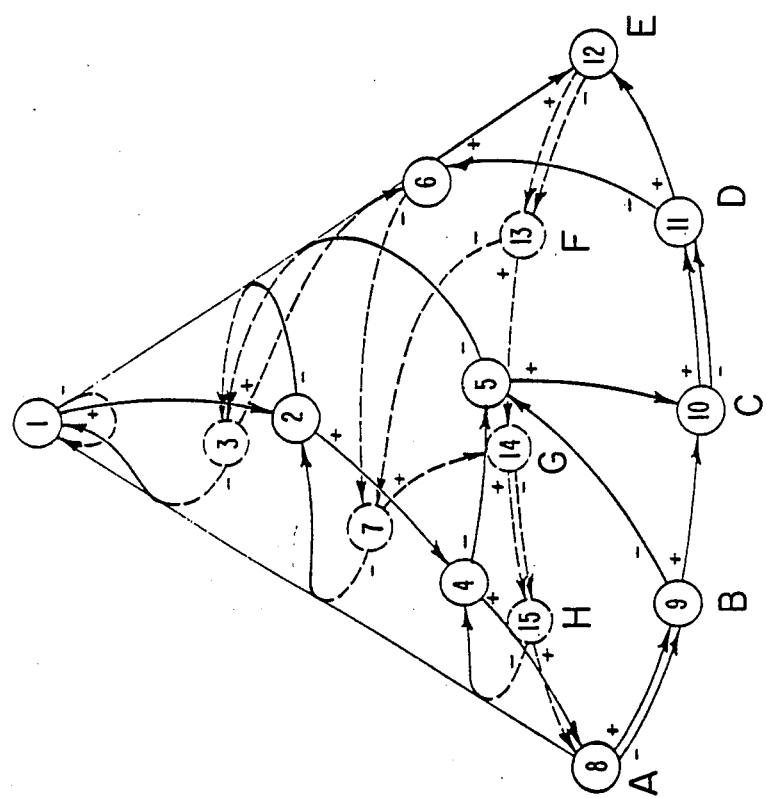
FIG. 8 is a state transition diagram for one embodiment of the present invention shown as a conical tree.

The practical consequences of this difference are enormous and have been verified. The protocol as implemented need not keep track of whether it is at a left side of the tree or right side of the tree. In fact, as shown in FIGS. 1 and 8, the tree implemented by the protocol can be viewed as being entirely symetrical and having no "sides" whatsoever. Thus there is no need for the protocol to keep track of when it must always return to the "top" of the tree, or when it must compute the length of, or number of messages in, a processing cycle. This will allow the protocol to run much faster and more efficiently than prior art protocols. For example, each state may be stored in a ROM. The ROM may be programmed to generate the next state based solely a binary representation of the address of the current state, and a binary signal indicating the existence of one or more messages in the current state. In one of the preferred embodiments, this binary signal indicates whether there is a message that could not be read in the span of the current state. This results in a protocol which allows a successive states to be determined in only one clock cycle after the existence of a message has been determined.

It may also be appreciated that various methods of determining successive states may be implemented using the protocol, provided that each state is capable of generating a successive state based solely on the existence of one or more messages in the prior state. For example, a protocol could be developed in which the binary signal was expanded to indicate the number of messages to be transmitted in a given span, and not just the existence of one or more untransmitted messages. Also, the method may be used with states having more than two sub-states, similar to to arrangement of B trees in database indices.

The invention has been found to be particularly useful when used to implement the protocol shown in FIG. 6. In this protocol, the rules for determining successive states may be stated as follows for the DC case:

1. if the current state is able to read a message, then read it.
2.1 if the current state just read a message successfully (or there was no collision), then
   if the current state is a root node, next state is the root node,
   if the current state is left node of its parent, then the next state is the right node of the parent,
   if the current state is the right node of its parent, then the next state is the next sequential state on the level of the current state's parent,
2.2 if there is a collision, then the next state is the left child node of the current state.

These rules may be repeated an unlimited number of times.

This protocol may be implemented using a general purpose computer interfaced with a terminal controller. An example of the source code necessary to implement the above embodiment of the invention for eight terminals is as follows:

```
DIM COLLISION(15)
DIM NOCOLLISION(15)
REM  THE COLLISSION ARRAY HOLDS THE SUBSEQUENT STATE NUMBERS
REM  FOR THE CURRENT STATE IF THERE IS A COLLISION IN THE
REM  CURRENT STATE
COLLISION(1) = 2
COLLISION(2) = 4
COLLISION(3) = 6
COLLISION(4) = 8
COLLISION(5) = 10
COLLISION(6) = 12
COLLISION(7) = 14
COLLISION(8) = 9
COLLISION(9) = 5
COLLISION(10) = 11
COLLISION(11) = 6
COLLISION(12) = 13
COLLISION(13) = 7
COLLISION(14) = 15
COLLISION(15) = 4
REM  THE NOCOLLISSION ARRAY HOLDS THE SUBSEQUENT STATE NUMBERS
REM  FOR THE CURRENT STATE IF THERE IS NOT A COLLISION IN THE
REM  CURRENT STATE
NOCOLLISION(1) = 1
NOCOLLISION(2) = 3
NOCOLLISION(3) = 1
NOCOLLISION(4) = 5
NOCOLLISION(5) = 3
NOCOLLISION(6) = 7
NOCOLLISION(7) = 2
NOCOLLISION(8) = 9
NOCOLLISION(9) = 5
NOCOLLISION(10) = 11
```

```
NOCOLLISION(11) = 6
NOCOLLISION(12) = 13
NOCOLLISION(13) = 7
NOCOLLISION(14) = 15
NOCOLLISION(15) = 4
INPUT PORT COM1: RECEIVES A SIGNAL FROM THE TERMINAL CONTROLLER
FOR EACH STATE. A 0 INDICATES NO COLLISION, AND A 1 INDICATES
A COLLISION FOR THE CURRENT STATE.
OUTPUT PORT COM2: SENDS THE NUMBER OF THE SUBSEQUENT STATE TO
THE TERMINAL CONTROLLER.
OPEN COM1: FOR INPUT AS #1
OPEN COM2: FOR OUTPUT AS #2
REM   THE INITIAL STATE IS 1, THE ROOT STATE.
STATE = 1
PRINT#2, STATE
WHILE (TRUE) DO
        INPUT #1, COLLDETECT
             REM   IF THERE IS A COLLISION, GET THE NEXT STATE FROM
             REM   COLLISION, OTHER WISE, GET THE NEXT STATE FROM
             REM   NOCOLLISION.
             IF COLLDETECT = 1 THEN
                   STATE = COLLISION(STATE)
             ELSE
                   STATE = NOCOLLISION(STATE)
             ENDIF
             OUTPUT #2, STATE
        ENDWHILE
        END
```

Figure 7:
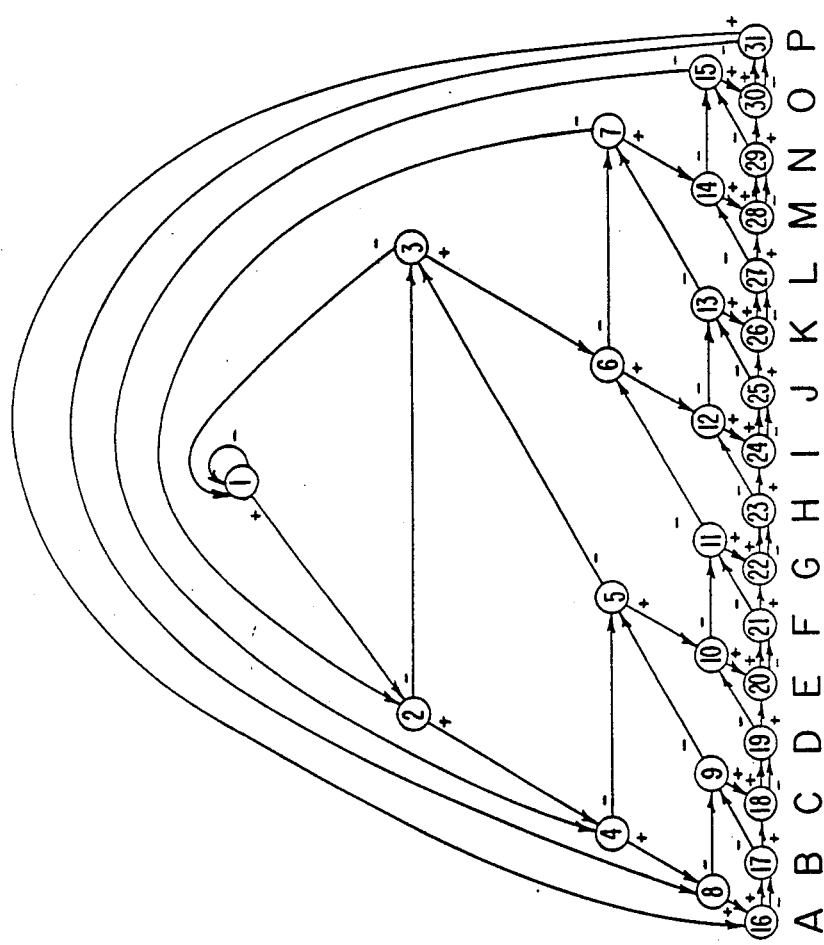
FIG. 7 is a state transition diagram for another embodiment of the present invention, for use in a CC network.

Another embodiment of the invention adapted specifically for CC networks is disclosed in FIG. 7. This protocol is similar to that disclosed in FIG. 6 and described above, except the protocol is responsive to the receipt of a single message after a poll is issued at the lowest level in the tree. As discussed above, with CC networks, the states at higher levels in the tree merely send out probes to determine if there is a message in the span of the current state. If a message is present in a span, the protocol is unable to determine the number of messages present, only the presence of one or more messages. Actual messages are only read when a poll is issued at the lowest level. The embodiment disclosed in FIG. 7 modifies the rules shown above as follows: if a message was just read successfully, then the next state is the state immediately following the current state on the same level. This difference is represented by the horizontal+arrows that move along the bottom level of the tree. In this case, these arrows represent the *recipt* of the message, as opposed to the existence of a message. Thus, these rules may be summarized as follows:

1. probe or poll the terminals spanned by the current state.
2. if the current state is able to read a message (there is a span of 1 for CC,) then read it,
3.1 if there is not a positive response to a probe, then
    if a message was just read successfully, the next state is the next sequential state on the same (lowest) level,
    if the current state is the root node, the next state is the root node,
    if the current state is left node of its parent, then the next state is the right node of the parent,
    if the current state is the right node of its parent, then the next state is the next sequential state on the level of the current state's parent.
3.2 if there is a positive response to a probe, then the next state is the left child node.

Again, this embodiment maintains the philosophy of the invention of determining subsequent states based only on environmental factors of the current state. In this embodiment the protocol is responsive to the receipt of a single message. Representative source code for this embodiment is as follows:

```
DIM ONEMESSAGE(15)
DIM PROBEPOSITIVE(15)
DIM PROBENEGATIVE(15)
REM   THE PROBEPOSITIVE ARRAY HOLDS THE SUBSEQUENT STATE NUMBERS
REM   FOR THE CURRET STATE IF THERE IS A POSITIVE PROBE RESPONSE
REM   IN THE CURRENT STATE
PROBEPOSITIVE(1) = 2
PROBEPOSITIVE(2) = 4
PROBEPOSITIVE(3) = 6
PROBEPOSITIVE(4) = 8
PROBEPOSITIVE(5) = 10
PROBEPOSITIVE(6) = 12
PROBEPOSITIVE(7) = 14
PROBEPOSITIVE(8) = 9
PROBEPOSITIVE(9) = 5
PROBEPOSITIVE(10) = 11
PROBEPOSITIVE(11) = 6
PROBEPOSITIVE(12) = 13
PROBEPOSITIVE(13) = 7
PROBEPOSITIVE(14) = 15
PROBEPOSITIVE(15) = 4
REM   THE PROBENEGATIVE ARRAY HOLDS THE SUBSEQUENT STATE NUMBERS
```

-continued

```
REM   FOR THE CURRENT STATE IF THERE IS NOT A POSITIVE RESPONSE
REM   TO A PROBE OR A POLL IN THE CURRENT STATE
PROBENEGATIVE(1) = 1
PROBENEGATIVE(2) = 3
PROBENEGATIVE(3) = 1
PROBENEGATIVE(4) = 5
PROBENEGATIVE(5) = 3
PROBENEGATIVE(6) = 7
PROBENEGATIVE(7) = 2
PROBENEGATIVE(8) = 9
PROBENEGATIVE(9) = 5
PROBENEGATIVE(10) = 11
PROBENEGATIVE(11) = 6
PROBENEGATIVE(12) = 13
PROBENEGATIVE(13) = 7
PROBENEGATIVE(14) = 15
PROBENEGATIVE(15) = 4
REM   THE ONEMESSAGE ARRAY HOLDS THE SUBSEQUENT STATE NUMBERS
REM   FOR THE CURRENT STATE IF THERE IS A POSITIVE RESPONSE
REM   TO A POLL
ONEMESSAGE(1) = NULL
ONEMESSAGE(2) = NULL
ONEMESSAGE(3) = NULL
ONEMESSAGE(4) = NULL
ONEMESSAGE(5) = NULL
ONEMESSAGE(6) = NULL
ONEMESSAGE(7) = NULL
ONEMESSAGE(8) = 9
ONEMESSAGE(9) = 10
ONEMESSAGE(10) = 11
ONEMESSAGE(11) = 12
ONEMESSAGE(12) = 13
ONEMESSAGE(13) = 14
ONEMESSAGE(14) = 15
ONEMESSAGE(15) = 8
INPUT PORT COM1: RECEIVES TWO SIGNALS FROM THE TERMINAL CONTROLLER FOR
EACH STATE: PROBEDETECT IS A 0 IF THERE IS NOT A POSITIVE RESPONSE TO
A PROBE OR POLL IN THE CURRENT STATE, OR A 1 IF THERE IS A POSITIVE
RESPONSE TO A PROBE IN THE CURRENT STATE. ONEMESSAGE IS A 0 IF THERE
WAS NO MESSAGE WAS SUCCESSFULLY READ IN THE CURRENT STATE, OR A 1 IF A
MESSAGE WAS SUCCESSFULLY READ IN THE CURRENT STATE
OUTPUT PORT COM2: SENDS THE NUMBER OF THE SUBSEQUENT STATE TO THE
TERMINAL CONTROLLER.
OPEN COM1: FOR INPUT AS #1
OPEN COM2: FOR OUTPUT AS #2
REM   THE INITIAL STATE IS 1, THE ROOT STATE.
STATE = 1
PRINT#2, STATE
WHILE (TRUE) DO
      INPUT #1, PROBEDETECT, RECEIVED
      REM   IF THERE IS A POSITIVE RESPONSE TO A PROBE, GET THE
      REM   NEXT STATE FROM PROBEPOSITIVE, OTHER WISE, GET THE
      REM   NEXT STATE FROM ONEMESSAGE IF A MESSAGE WAS RECEIVED
      REM   OR ELSE FROM PROBENEGATIVE.
      IF PROBEDETECT = 1 THEN
            STATE = PROBEPOSITIVE(STATE)
      ELSE
            IF ONEMESSAGE = 0 THEN
                  STATE = PROBENEGATIVE(STATE)
            ELSE
                  STATE = ONEMESSAGE(STATE)
            ENDIF
      ENDIF
      OUTPUT #2, STATE
ENDWHILE
END
```

It may be appreciated that in both of the above examples, arrays are used to store subsequent states, indexed by the current state number. However, the subsequent states may also be computed from the current state number, based on the existence of one or more messages. For the first protocol above, the subsequent state may be determined by the following:

```
Let  EVEN = [ele = 2*i where i ∅]
     cend = (clc = 2^i−1 for all i ∅)
     NS = Subsequent state
     PS = Present state
     N = Number of terminals
     Collision = True if 2 or more busy terminals spanned by
                 PS
     IF   COLLISION THEN
          NS = PS * 2
     Else if PS    EVEN then
          NS = PS + 1
     else if PS    cend then
          NS = MAX (2^{[MOD2(PS)]−1}, 1)
     else
```

-continued $$NS = \frac{PS + 1}{2}$$

and for the second protocol, the subsequent state may be determined by the following:

```
Let  EVEN = [ele = 2*i for all i ∅]
     cend = (clc = 2^i−1 for all i ∅)
     NS = Subsequent state
     PS = Present state
     N = Number of terminals
     Probe = True if positive response to a probe, false
             otherwise
     Poll = True if positive response to a poll, false otherwise
if   probe then
         NS = PS * 2
Else if PSE EVEN then
         NS = PS + 1
else if Poll then
         if PS cend then
             NS = N
         else
             NS = PS + 1
     else
         if PS cend then
             NS = MAX (2^[MOD2(PS)]−1, 1)
         else
             NS = PS + 1
                   ─────
                     2
```

In all of the above embodiments, it may be appreciated that the subsequent state is determined soley from the current state, and the existence (or receipt) of one or more messages in the current state. Therefore, the concept of a processing "cycle" is eliminated. The protocol constantly moves from state to state, with no logical end as represented by the state transition diagrams of FIGS. 1 and 8. The state transitions coming from "right-most" states in FIG. 6 have been "wrapped around" to the "left-most" states in FIG. 8. FIG. 1 also provides a "bird's eye" view of this state transition diagram. These Figures point out the "cycleless" nature of the state transitions.

Figure 9:
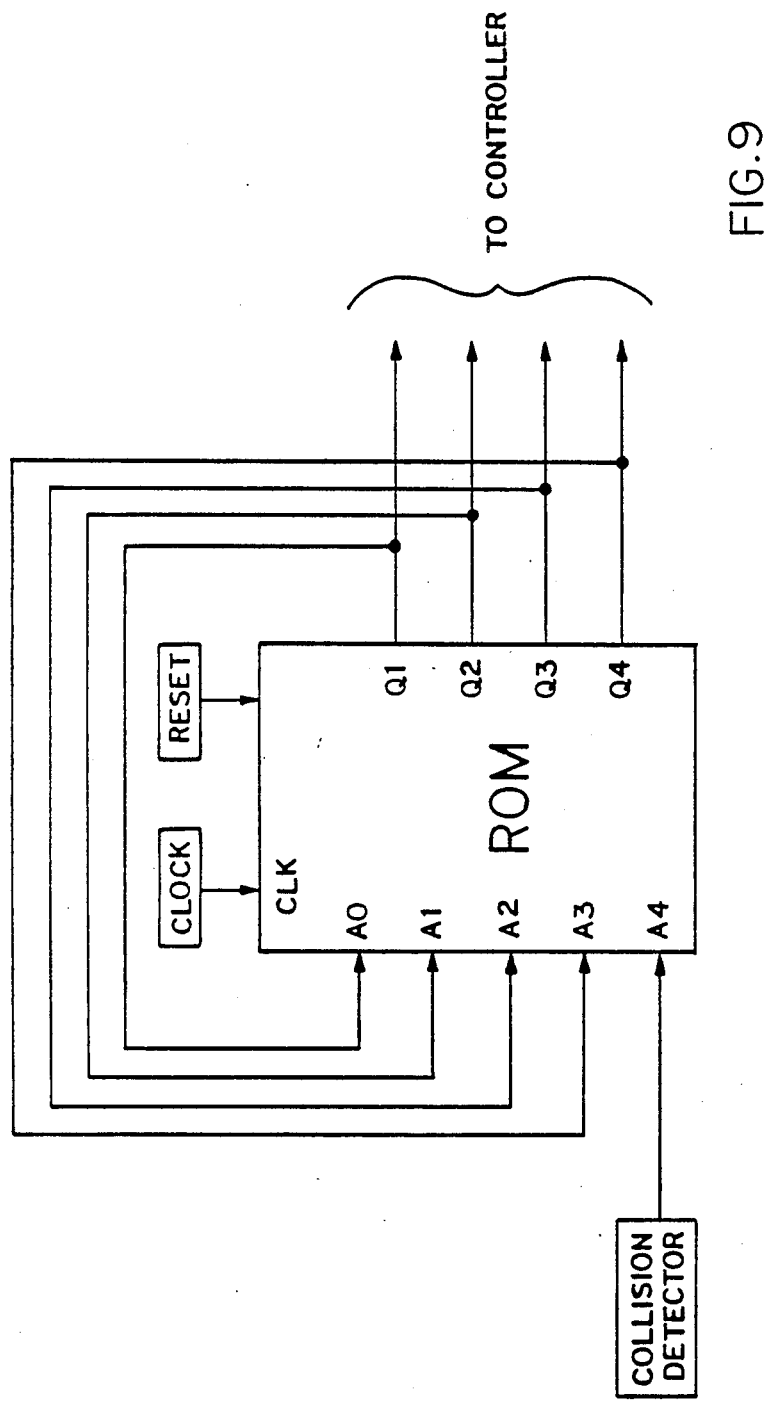
FIG. 9 is a block diagram showing the implementation of one form of the protocol by using a ROM.

FIG. 9 discloses a hardware implementation of the invention, using a ROM. In this embodiment, each state when combined with a binary signal representing the presence or absence of a collision for that state acts as an address to the ROM. The binary signal is provided by the terminal controller. The address stores a representation of the subsequent state for the state-message presence combination. This output is transmitted to the terminal controller which actually enables the appropriate group or subgroup based on the state number. The actual method used for enabling or disabling a particular group of terminals is well known in the art and not a part of this invention. The output state is also fed back into the input of the ROM to determine the following state.

It may also be appreciated that for the CC based modified alogrithim described above, an additional address input signal line may be added to the ROM, which would indicate the receipt or non-receipt of a message for the current state. The addresses represented by this additional address "bit" would then hold the subsequent state numbers, as represented for example, by the lowest level of the state transition diagram of FIG. 7.

In some instances, it may be desirable to give a particular terminal in a network a priority, so that its messages are transmitted more frequently than other terminals in the network. This may be accomplished by assigning the same physical terminal multiple addresses. With reference to FIG. 4 for example, this could be accomplished by assigning the address for state 24 to terminal A instead of terminal I. Although this would mean one less terminal could be included in the network, terminal A would be monitored twice as frequent for untransmitted messages. The methods for assigning and implementing a plurality of addresses to a single terminal is also well know in the art.

The techniques and apparatus used for actually detecting collisions, probing, polling and transmitting messages is well known in the art, and not considered a fundamental element of the invention. However, the actual method of determining which terminals should be enabled or disabled in various states, and the methods for charging states, is considered an important aspect of the invention.

I claim:

1. A system for designating groups of terminals in binary tree network including:
   means for logically grouping the terminals in a binary tree,
   means for designating terminal groups (states) of various sizes, including a root state and recursively defined first (left) and second (right) substates from said root state, said states
   and means for selecting a subsequent state from a current state, including means whereby from a current rightmost substate, a leftmost substate may be selected; characterized in that
   the selection criterion for selecting a subsequent state from a current right substate is the same for all right substates.

2. The system of claim 1 in which each subsequent state is never more than one level higher or lower in the tree than the current state.

3. The system of claim 2 in which for each right substate in which a message is received, the following substate is the immediately following left substate on the same level.

4. The system of claim 3 in which said system is centrally controlled.

5. The system of claim 1 in which said system is centrally controlled.

6. The system of claim 1 in which said system utilizes distributed control.

7. The system of claim 1 further comprising means such that a single terminal is individually selected by more than one substate thereby giving said single terminal a processing priority.

8. The system of claim 1 wherein
   each subsequent state is selected based on the current state and the existence of an untransmitted message in the current state.

9. The system of claim 1 wherein
   each subsequent state is selected based on the current state and the receipt of a message in the current state.

10. The system of claim 8 wherein said system is centrally controlled.

11. The system of any one of claims 1-10 in which
    a representation of each possible subsequent state from each current state is stored in an addressable memory device in which the current state constitutes a portion of the address for each subsequent state.

12. The system of claim 11 in which the addressable storage device comprises a ROM or a RAM.

13. The system of claim 11 wherein each subsequent state is selected based on the receipt of a message in the current state.

14. The system of claim 12 in which each subsequent state is selected based on the existence of an untransmitted message in the current state.

* * * * *